United States Patent [19]

Aneiros et al.

[11] Patent Number: 5,372,398
[45] Date of Patent: Dec. 13, 1994

[54] VEHICLE SEAT ASSEMBLY WITH RETRACTING LATCH/ENGAGING ROLLER SEAT-TO-FLOOR LOCK

[75] Inventors: Ricardo Z. Aneiros, Dearborn; Matthew E. Dukatz, Bloomfield Hills; Fred C. Kresky, Rochester Hills; Jay P. McCarthy, Livonia, all of Mich.

[73] Assignees: Chrysler Corporation, Highland Park, Mich.; Atoma International Inc., Newmarket, Canada

[21] Appl. No.: 41,459

[22] Filed: Apr. 2, 1993

[51] Int. Cl.⁵ .............................................. B60N 2/10
[52] U.S. Cl. .................................. 296/65.1; 248/503.1; 248/430
[58] Field of Search .................................. 296/65.1, 63; 248/503.1, 430

[56] References Cited

U.S. PATENT DOCUMENTS

| | | | |
|---|---|---|---|
| 1,644,528 | 10/1927 | Huff | 296/65.1 |
| 2,101,210 | 12/1937 | Barclay | 296/65.1 |
| 3,848,924 | 11/1974 | Shoemaker et al. | 297/434 |
| 3,865,427 | 2/1975 | Delany | 296/68 |
| 4,157,797 | 6/1979 | Fox | 296/65.1 |
| 4,194,782 | 3/1980 | Itoh | 296/65.1 |
| 4,395,011 | 7/1983 | Torta | 296/65.1 X |
| 4,432,524 | 2/1984 | Wize | 248/430 X |
| 4,759,580 | 7/1988 | Berklich et al. | 296/65.1 |
| 4,773,693 | 9/1988 | Premji et al. | 296/65.1 |
| 4,865,377 | 9/1989 | Musser et al. | 296/65.1 |
| 4,936,527 | 6/1990 | Gorges | 244/118.6 |
| 5,238,285 | 8/1993 | Holdampf et al. | 296/65.1 |

FOREIGN PATENT DOCUMENTS

| | | | |
|---|---|---|---|
| 55-160626A | 12/1980 | Japan | 296/65.1 |
| 89/00115 | 1/1989 | WIPO | 248/430 |

Primary Examiner—David M. Mitchell
Attorney, Agent, or Firm—Cushman, Darby & Cushman

[57] ABSTRACT

An easily removable vehicle seat is provided for use with a vehicle including a floor having an upwardly facing surface. The floor includes front and rear wells extending below the upwardly facing surface and anchor members extending across the wells. The vehicle seat includes a rigid support structure having a downwardly facing surface for engaging the anchor members of the vehicle floor. A cushioned seat structure is provided on the rigid support structure. The vehicle seat also includes hook members mounted on the rigid support structure for movement between (1) an operative position extending below the downwardly facing surface so as to enter the wells and engage in hooked relationship with the anchor members and (2) an inoperative position disposed above the operative position thereof so as to enable the rigid support structure to be moved relatively over the floor. Wheels are mounted on said rigid support structure for movement between (1) an operative position extending below the downwardly facing surface of the rigid support structure and so as to enable the rigid support structure to be rolled over the upwardly facing surface of the vehicle floor and (2) an inoperative position disposed above the operative position thereof. The vehicle seat further includes a mechanism for moving the hook members into the operative position thereof and the wheels into the inoperative position thereof and for moving the hook members into the inoperative position thereof and the wheels into the operative position thereof.

22 Claims, 11 Drawing Sheets

VEHICLE SEAT ASSEMBLY WITH RETRACTING LATCH/ENGAGING ROLLER SEAT-TO-FLOOR LOCK

BACKGROUND OF THE INVENTION

This invention relates to removable vehicle seats, and in particular to easily removable vehicle seats which may be securely latched to the floor of the vehicle in an operative position and then released from the operative position and rolled to, and removed from, the opening of the vehicle.

Conventional removable vehicle seats include a seat cushion mounted to a riser assembly which provides the proper seat cushion height for optimal occupant comfort. Conventional riser assemblies for such seats provide a method of retaining the seat to the floor of the vehicle by means of a latch or a lock. Removal of the seat is achieved by unlatching the seat from the floor, then lifting and carrying the seat out of the vehicle to a place of storage. Typically, such seats must be removed when vehicle cargo space is required then reinstalled when passenger seating is needed. Lifting the vehicle seat to the opening of the vehicle and then from the vehicle to the storage area can be quite burdensome for the individual performing this task. Occasionally, when the vehicle seat is quite heavy, the seat is dragged across the floor of the vehicle and then removed from the vehicle opening causing damage to the interior of the vehicle or to the latching elements of the seat.

A need therefore exists to provide an easily removable vehicle seat which may be securely latched to the floor of the vehicle in an operative position and rolled to the opening of the vehicle while the latches are disposed in an inoperative position so as to minimize lifting of the seat upon removal.

An object of the present invention is to fulfill the above need. In accordance with the principles of the present invention, the objective is obtained by providing an easily removable vehicle seat for use with a vehicle including a floor having an upwardly facing surface. The floor includes front and rear wells extending below the upwardly facing surface and anchor members extending across the wells in a position above or below the upwardly facing surface. The vehicle seat includes a rigid support structure having a downwardly facing surface for engaging the anchor members of the vehicle floor. A cushioned seat structure is provided on the rigid support structure. The vehicle seat also includes hook members mounted on the rigid support structure for movement between (1) an operative position extending below the downwardly facing surface so as to enter the wells and engage in hooked relationship with the anchor members extending thereacross so as to detachably fixedly retain the rigid support structure and hence the cushioned seat structure thereon in a fixed operative position on the floor with the anchor members and the downwardly facing surface in engagement and (2) an inoperative position disposed above the operative position thereof so as to enable the rigid support structure to be moved relatively over the floor. Wheels are mounted on said rigid support structure for movement between (1) an operative position extending below the downwardly facing surface of the rigid support structure and the hook members when in the inoperative position thereof so as to enable the rigid support structure and hence the cushioned seat structure thereon to be rolled over the upwardly facing surface of the vehicle floor and (2) an inoperative position disposed above the operative position thereof. The vehicle seat further includes a mechanism for (1) moving the hook members into the operative position thereof and the wheels into the inoperative position thereof when it is desired to fixedly retain the rigid support structure and hence the cushioned seat structure thereon in the operative position thereof and (2) moving the hook members into the inoperative position thereof and the wheels into the operative position thereof when it is desired to move the rigid support structure and hence the cushioned seat structure thereon from the operative position thereof in rolling supported relation over the upwardly facing surface of the vehicle floor.

Another object of the present invention is the provision of a vehicle seat of the type described which is simple in construction, effective in operation and economical to manufacture and maintain.

These and the other objects of the present invention will become apparent during the course of the following detailed description and appended claims.

The invention may be best understood with reference to the accompanying drawings wherein an illustrative embodiment is shown.

Figures 1, 1A:
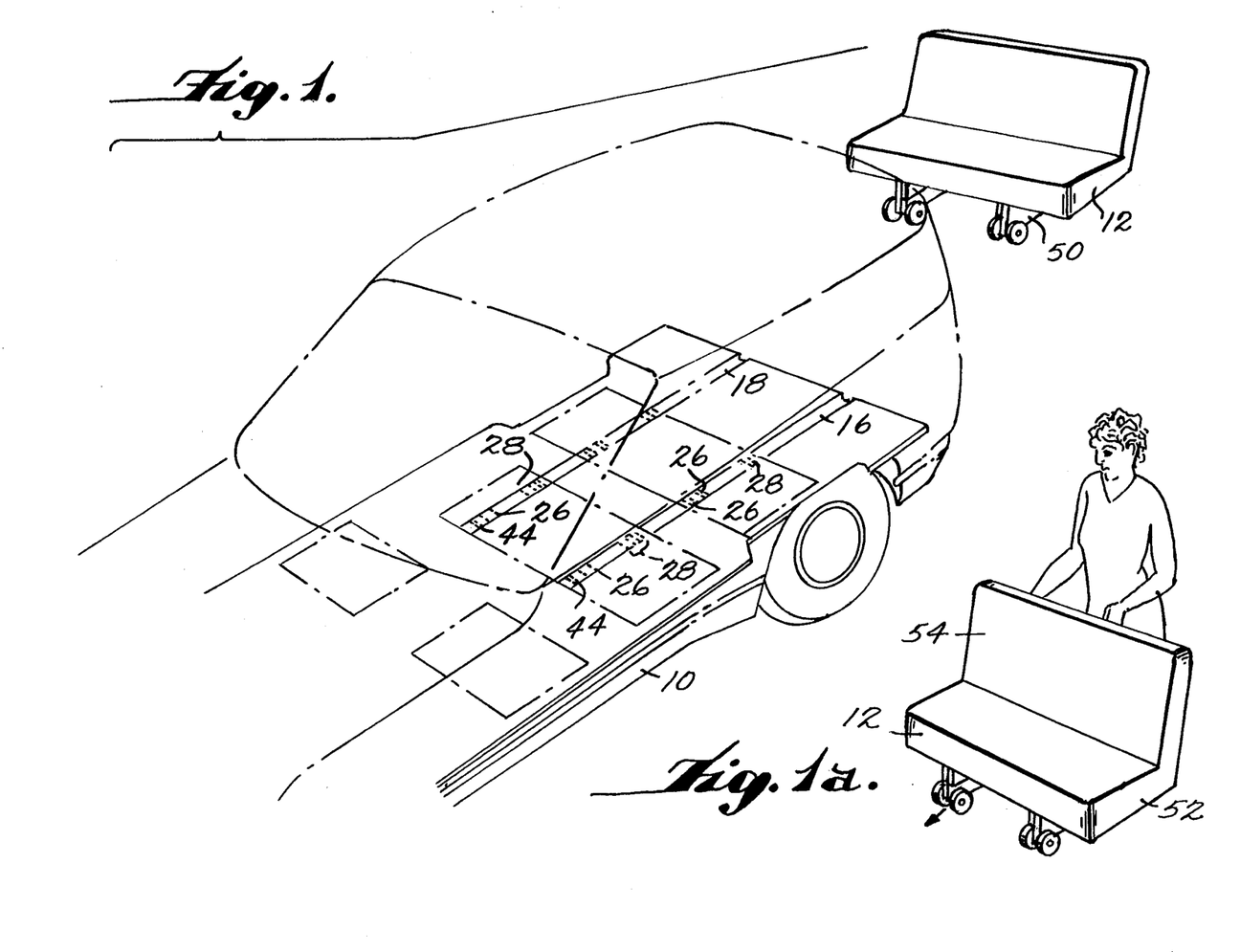
FIG. 1 is a perspective view of a removable seat assembly embodying the principles of the present invention shown after removal from a vehicle.
FIG. 1a is a perspective view of a seat assembly of the present invention shown being pushed to a storage area after being removed from a vehicle.

Referring to the drawings, particularly to FIG. 1, a vehicle 10 is shown having a body 11 in which a removable seat assembly 12 may be inserted. The body 11 has a floor 14 for supporting seat assembly 12. In the illustrated embodiment, the floor 14, as shown, may support two seat assemblies. However, it can be appreciated that additional or fewer seat assemblies may be provided depending upon the type, size and configuration of the vehicle. When the seat assembly 12 is removed from the vehicle, the floor 14 may be used to support cargo.

Figure 6:
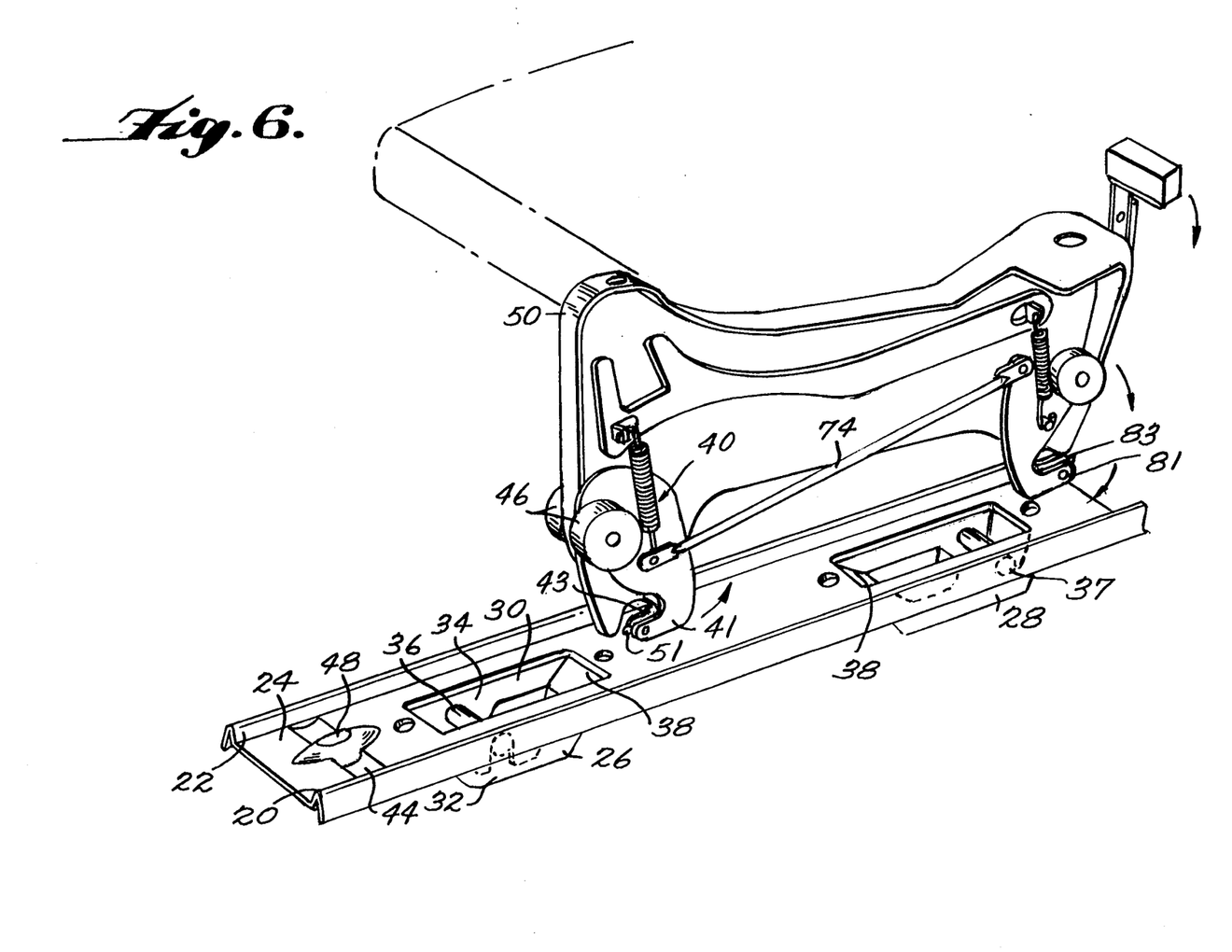
FIG. 6 is a perspective view of the latch/release assembly mounted on a riser support embodying the principles of the present invention about to be engaged with a vehicle floor, shown with a portion of the floor and seat assembly removed for clarity of illustration.

In the illustrated embodiment, the floor 14 includes first and second guide tracks, respectively indicated at 16, 18. The guide tracks 16, 18 extend in the longitudinal direction of the vehicle 10 and are disposed in parallel so as to accommodate the width of the seat assembly 12. Each track 16, 18 is defined by side edges 20, 22 and surface 24 which faces upwardly (FIG. 6). The side edges 20, 22 protrude above the floor 14, the function of which will become apparent below.

Each track 16, 18 includes a plurality of wells which are used to secure the seat assembly to the floor 14. As shown in FIG. 1, one seat assembly 12 requires four wells for the mounting thereof, two front wells 26 and two rear wells 28 with respect to the longitudinal axis of the vehicle. One front well 26 is disposed in front of one rear well 28 in respective tracks 16, 18. In the illustrated embodiment, each track includes six wells to accommodate various seating combinations. Thus, different combinations of wells may be used depending on the desired spacing of the vehicle seats.

Figure 5:
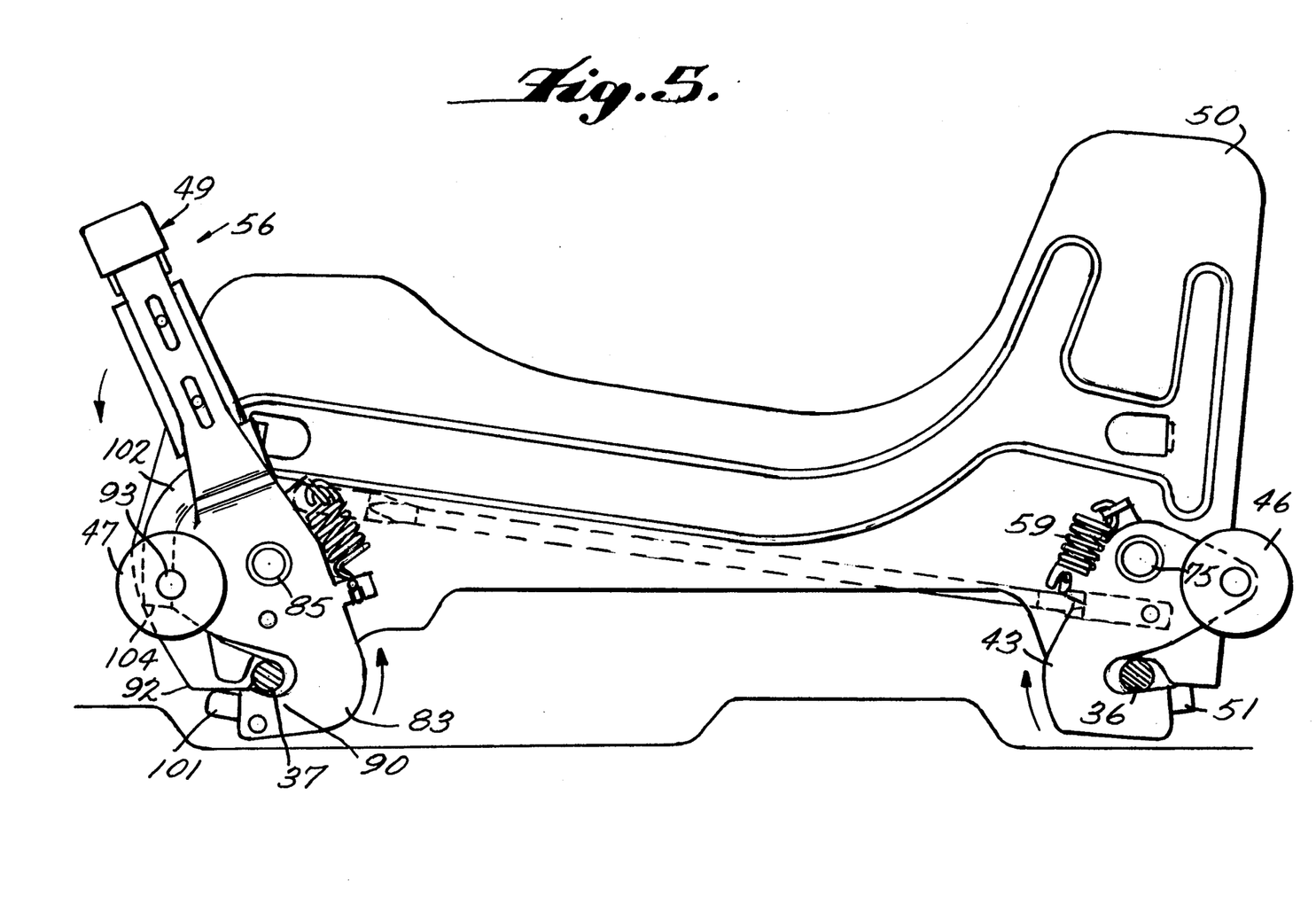
FIG. 5 is a rear elevational view of the latch/release assembly mounted on a riser support embodying the principles of the present invention shown engaged with a vehicle floor and with its wheels disposed in an inoperative position.

As shown in FIG. 6, each well 26, 28 is defined in surface 24 of tracks 16, 18 defining opening 30. Each well has a width slightly smaller than the width of surface 24. Each well 26, 28 has a bottom surface 32 and side walls 34. The wells 26, 28 extend below the floor 14 of the vehicle. in addition, each front well 26 includes a striker pin 36 and each rear well 28 includes a striker pin 37 at one end thereof. The striker pins 36, 37 are disposed perpendicular to the longitudinal axis of each track 16, 18 and extend the width of each well 26, 28. The striker pins 36, 37 are fixedly mounted slightly below surface 24 of each track inside walls 34 of the wells 26, 28. Opposite the striker pins 36, 37, each well has a tapered surface 38 which aids in guiding latch or hook members 40, 42 of the seat assembly 12 into the well, which will become more apparent below. If guide tracks are not provided, the wells 26, 28 may be disposed below the sheet metal floor of the vehicle, with the striker pins being disposed above the well and above the level of the floor as shown in FIG. 5.

As shown in FIG. 6, a groove 44 is provided in surface 24 of each track 16, 18 extending the width thereof. In the illustrated embodiment, one groove 44 is provided for the forward seat assembly 12 and is disposed in each track 16, 18 near the two front wells 26 (FIG. 1). Each groove 44 engages pairs of front wheels 46 on the seat assembly to correctly locate a latching position of the forward seat assembly 12, which will become more apparent below.

Figure 2:
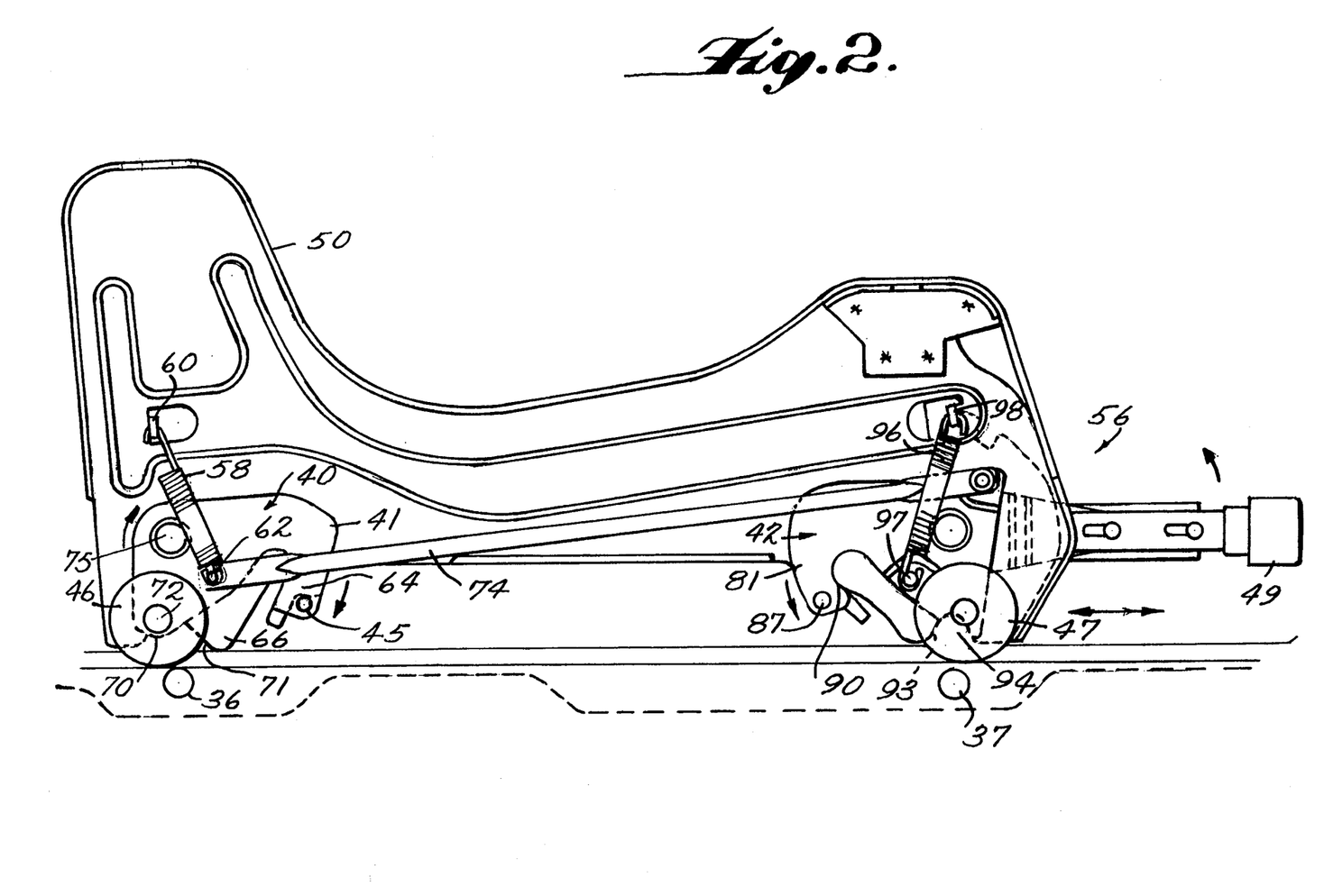
FIG. 2 is a front elevational view of the latch/release assembly mounted on a riser support embodying the principles of the present invention shown with its wheels disposed in an operative position.

Disposed centrally within each groove 44 and extending above surface 24 of the tracks 16, 18 is a self-centering guide 48. The guide 48 centers the front wheels 46 and thus, aligns the seat assembly 12 within the tracks 16, 18 as the seat assembly is moved along the tracks to the latching position (FIG. 2).

Figure 11A:
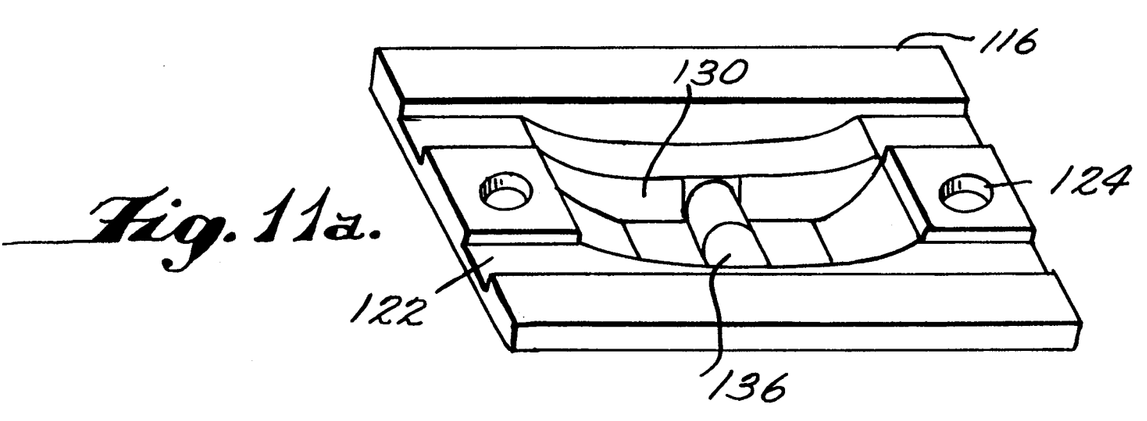
FIGS. 11A–11B are perspective view of striker assemblies provided in accordance with the principles of the present invention.
Figure 11B:
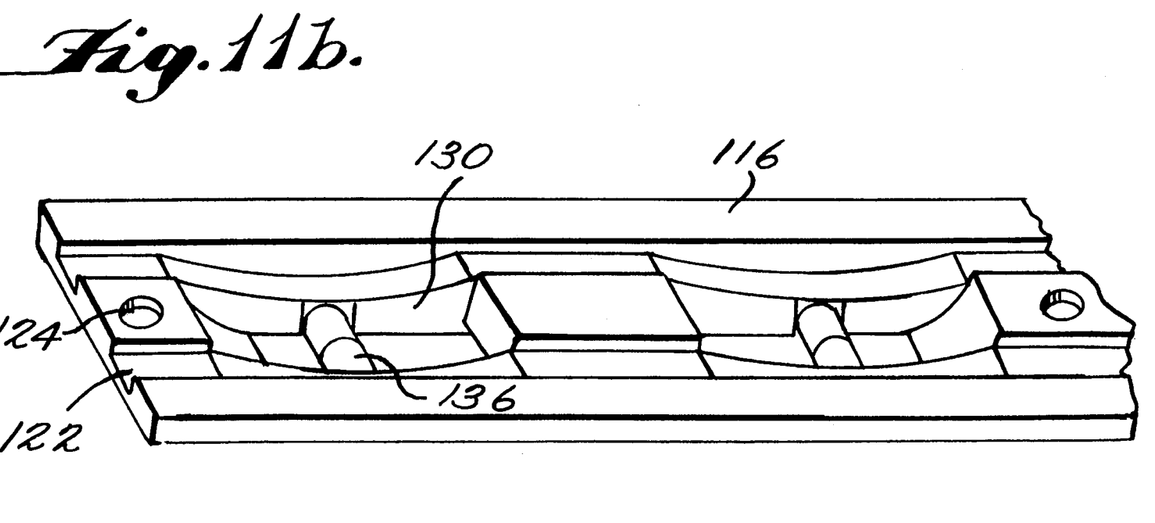

As an alternative to providing guide tracks striker assemblies 116 may be provided. As shown in FIGS. 11A and 11B, each striker assembly may include one or more striker pins 136. Each assembly 116 includes a well 130 for each striker pin 136. Mounting bosses 124 are provided to secure each assembly 116 to the floor of the vehicle 10. Wheel grooves 122 are preferably provided to assist in positioning the seat over the wells 130.

Referring to drawings, the seat assembly 12 embodying the principles of the present invention is shown. The seat assembly 12 includes a pair of transversely spaced, rigid riser support structures 50. A seat cushion 52 and back cushion 54 are mounted on the riser support structures 50. The seat cushion 52 and back cushion 54 constitute a cushioned seat structure.

Figure 4:
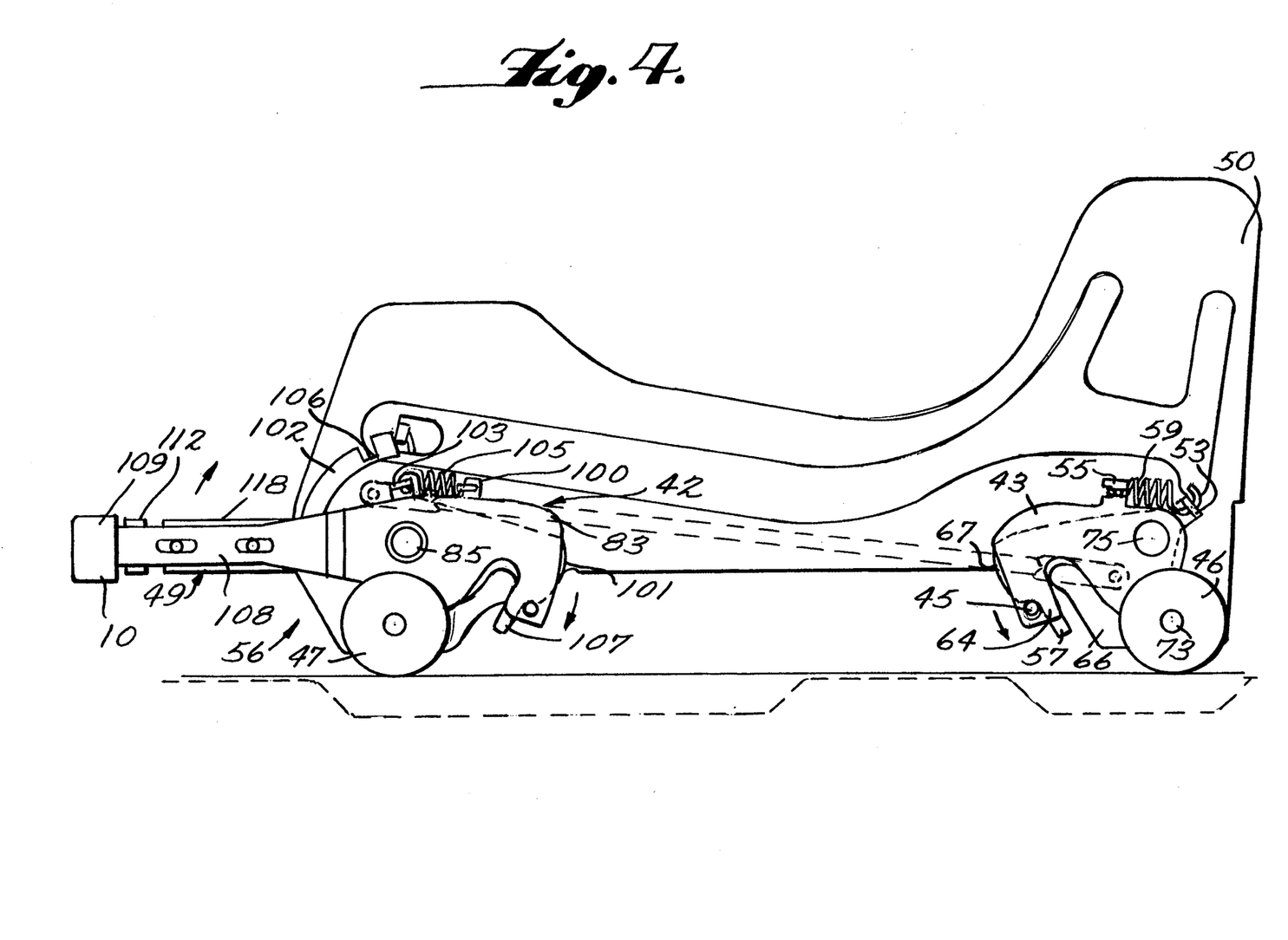
FIG. 4 is a rear elevational view of the latch/release assembly mounted on a riser support embodying the principles of the present invention shown with its wheels disposed in an operative position.

Each riser support structure 50 includes a latch/release assembly mounted generally indicated at 56 mounted thereon. Each latch/release assembly includes a front latch or hook member 40, a pair of front wheel members or wheels 46 mounted thereon, a rear latch or hook member 42, a pair of rear wheel members or wheels 47 mounted thereon an an actuating mechanism 49 operatively connected with the hook members to simultaneously move the same. Each latch/release assembly 56 is used to lock the seat assembly 12 within the tracks 16, 18 and used to enable the seat assembly 12 to be rollingly moved when not in the locked position. Both latch/release assemblies 56 are similarly configured, so only one will be specifically described below. The forward latch member 40 of the latch/release assembly 56 includes a front left latch plate 41 and a front right latch plate 43. The front left and right latch plates are disposed on opposing sides of the riser support structure 50, as shown in FIGS. 2 and 4. As shown in FIG. 2, with the cushions removed for clarity, the front left latch plate 41 includes an overhead spring 58 coupled to bracket 60, which is affixed to the riser support structure 50 at one end thereof. The other end of spring 58 is coupled to projection 62 which protrudes from the front left latch plate 41.

The front left latch plate 41 and the front right latch plate 43 each have a hook portions 64 disposed at distal ends thereof. The hook portions 64 are aligned with each other. The front left and right latch plates are coupled together by pin 45 and move simultaneously about pivot element 75, when actuated. When in an operative locking position, the hook portions 64 are disposed adjacent to a protruding portion 66 extending downwardly from a bottom surface of the riser support structure 50. The protruding portion 66 includes a cutout 70, defined downwardly facing surface 71 the function of which will become more apparent below.

Front wheels 46 are coupled to both the front left latch plate 41 and front right latch plate 43, so that the riser support structure 50 is disposed therebetween. One wheel 46 is rotatably coupled to the front left latch plate 41 by axle 72. A second wheel 46 is individually rotatably coupled to front right latch plate 43 by axle 73.

As shown in FIG. 4, disposed between the front right latch plate 43 and riser support structure 50 is a rattle plate 51. The rattle plate 51 includes tab member 53 opposite hooked end 57. The front right latch plate 43 includes a projection 55. A spring 59 is coupled to tab member 53 and projection 55 to couple the rattle plate 51 to the front right latch plate 43. In addition, the rattle plate 51 is coupled to pivot element 75 and moves with the forward latch or hook member 40 when actuated. The spring 59 provides resilience so that the forward latch member 40 will not bind during actuation, and ensures proper latching with the aid of the hooked end 57, which will become more apparent below.

The actuating mechanism 49 includes a connecting rod 74 which couples the forward latch member 40 to the rear latch member 42. End 76 of connecting rod 74 is affixed to protrusion 62. End 82 of the connecting rod is fixed to the rear latch member 42 at protrusion 84.

Similar to the forward latch member 40, the rear latch member 42 also includes a rear left latch plate 81 and a rear right latch plate 83, disposed on opposite sides of the riser support 50. The rear left latch plate 81 is coupled to the rear right latch plate 83 by pin 87, and moved simultaneously therewith about pivot 85, when actuated.

The rear wheels 47 are coupled to both the rear left latch plate 81 and rear right latch plate 83, so that the riser support structure 50 is disposed therebetween. One wheel 47 is rotatably coupled to the rear left latch plate 81 by axle 91. A second wheel 47 is rotatably coupled to rear right latch plate 83 by axle 93.

Hook portions 90 are defined at the distal end of both the rear left latch plate 81 and rear right latch plate 83 of the rear latch member 42 and are aligned with each other. When in an operative locking position, the hook portions 90 are disposed adjacent to a second protruding portion 92 extending downwardly from the bottom of the riser support structure 50. The second protruding portion 92 includes a notch 94 defining downwardly facing surface 93, the function of which will become more apparent below.

The rear left latch plate 81 includes a spring 96 which is affixed at one end thereof to a bracket 98 which in turn is fixed to the riser support structure 50. The other end of the spring 96 is affixed to the projection 97 of the rear left latch plate 81.

Referring to FIG. 4, the rear right latch plate 83 of the rear latch or hook member 42 includes a tab member 100. A rear rattle plate 101 is disposed between the riser support structure 50 and the rear right latch plate 83. The rattle plate 101 is pivotally coupled to the rear left latch plate 81 and rear right latch plate 83 at pivot 85 and moves simultaneously therewith upon actuation. The rattle plate 101 includes bracket 103 opposite hooked end 107. A spring 105 is coupled to the bracket 103 and tab member 100. The spring 105 provides resilience so that the rear latch member 42 will not bind during actuation, and ensures proper latching with the aid of the hooked end 107, which will become more apparent below.

A bracket 102 is affixed between the riser support structure 50 and the rattle plate 101. The bracket includes a blunt end 104 (FIG. 5) and a slot portion 106 (FIG. 4) used to lock the actuating mechanism 49 of the latch/release assembly 56 in two distinct positions, which will become more apparent below.

Figure 3:
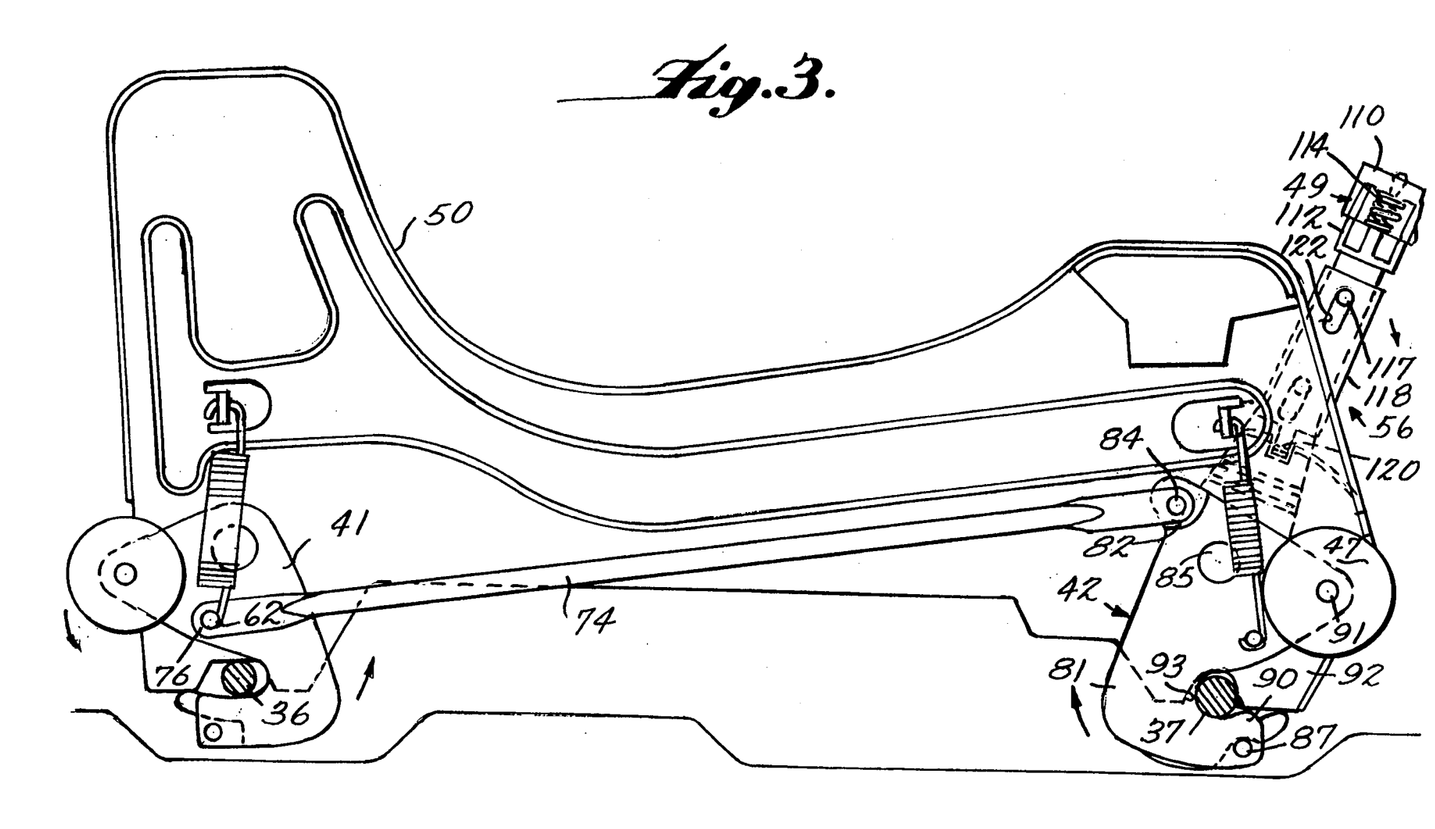
FIG. 3 is a front elevational view of the latch/release assembly mounted on a riser support embodying the principles of the present invention shown engaged with a vehicle floor and with its wheels disposed in an inoperative position.

The rear right latch plate 83 includes an elongated portion 108, as shown in FIG. 4. The elongated portion 108 extends past the end of the riser support structure 50. Affixed to the distal end of the elongated portion 108 is a handle 109 which defines an actuator of the actuating mechanism 49. The handle 109 includes a top potion 110 and a bottom portion 112, with a spring 114 disposed therebetween (FIG. 3). The elongated portion 108 includes projections 117 which protrude from the surface thereof. The bottom portion 112 of the handle 109 includes a slidable member 118. The end of the slidable member has a locking tab 120 projecting therefrom. The slidable member includes slots 122, wherein the projection 117 are disposed. Upon compressing the spring 114 in the handle 109, the slidable member 118 moves upwardly along the longitudinal axis of the elongated portion 108. The elongated portion can now be rotated either upwardly or downwardly to place the wheels in an inoperative or operative position. Once in the proper position, the handle 109 is released and the spring 114 moves the slidable member downwardly to lock the elongated portion in place by engaging locking tab 120 with slot 106 or blunt end 104, which will become more apparent below.

With references to the FIGURES, the installation of the seat assembly 12 into the vehicle will be described. The seat assembly 12 is lifted into the opening 108 of the vehicle 10 with the latch or hook members 40, 42 disposed in an inoperative position and the wheel pairs 46, 47 disposed in an operative position, as shown in FIG. 2. When the latch members 40, 42 are in the inoperative position, the front pair of wheels 46 and the rear pair wheels 47 are disposed in an operative position below hook portions 64 and 90 of the latch members 40 and 42 respectively. When the wheels are disposed in the operative position, the handle or actuator 109 of the actuating mechanism 49 is locked in place with the locking tab 120 engaged with blunt end 104.

The front wheels 46, disposed on each side of the riser support structure 50, are guided into respective tracks 16, 18. Upon pushing the seat assembly forward into the vehicle, both front and rear wheels pairs 46 and 47 roll along surface 24 of each track 16, 18 within edges 20 and 22.

The seat assembly 12 is pushed further along the tracks 16, 18 and the self-centering guides 48 assure proper positioning of the seat assembly 12 within the tracks 16, 18, by guiding the wheels. The seat assembly 12 is properly positioned in the tracks 16, 18 when the guides 48 are disposed between the front pairs of wheels 46. The seat assembly 12 is in the proper latching position within the vehicle 10 with the forward latch member 40 being disposed above the front well 26 and the rear latch member 42 being disposed above the rear well 28, when the front wheels are felt to engage grooves 44 in tracks 16, 18.

Handle 109 of the actuating mechanism 49 is then engaged to compress spring 114 and to release the locking tab 120 from the blunt end 104. The handle 109 can then be rotated upward to secure the seat assembly 12 in the vehicle 10. Thus raising of the handle 109 causes the rear latch member 42 to move downwardly, as shown by the arrows in FIG. 2. Connecting rod 74 of the actuating mechanism 49 transmits the motion of the rear latch member 42 to the forward latch member to simultaneously move the forward latch member 40 downwardly in an opposite direction thereto. The forward and rear latch members 40, 42 slide along the tapered surface 38 of respective wells 28, 26 until they are positioned beneath the striker pins 36, 37.

As shown in FIGS. 3 and 5, the forward latch member 40 is fully engaged when the hook portions 64 thereof and downwardly facing surface 71 of the riser support structure 50 are in substantially surrounding relation with the striker pin 36. As noted above, rattle plate 51 ensures a tight rattle free fit with pin 36. Similarly, the rear latch member 42 is fully engaged when the hook portions 90 thereof and downwardly facing surface 93 in substantially surrounding relation with striker pin 37. The rear rattle plate 101 ensure a tight rattle free fit with pin 37. When the latch members 40, 42 are in the engaged or operative position, the wheels 46, 47 are disposed above the latch members 40 and 42 respectively in an inoperative position. The weight of the seat assembly is now supported by the vehicle floor and striker pins. Springs 58, 96 provide the force required to ensure that the latch members 40, 42 are properly engaged with the striker pins so to eliminate potential rattles at the handle 109 of the pin to latch member interface. The actuating mechanism 49 is locked in place when the locking tab 120 is engaged with slot 106.

To remove the seat assembly 12, the handle 109 is engaged to release the locking tab 120 from the slot 106 and then moved downwardly which in turn releases the forward and rear latch members 40, 42 from the respective striker pins 36, 37 while simultaneously moving the wheels 46, 47 to their operative position. The latch members 40, 42 move to an inoperative position above the wheels 46, 47. The springs 58 and 96 assist in lifting the riser support structure 50 and attached cushions 52, 54 when the wheels are moved to their operative position. The weight of the seat assembly is now supported by the wheels.

The seat assembly 12 can then be rolled to the vehicle opening 108 along the tracks 16, 18. Of course, guide tracks need not be provided and alternatively, the seat assembly 12 may be rolled along the floor 14 of the vehicle to be removed. The seat assembly 12 is then lifted out of the vehicle opening 108 and placed on the ground in a position to be rolled to a storage area.

Referring to FIGS. 7-10, a second embodiment of latch/release assembly 156 mounted on a riser support structure 50 provided in accordance with the principles of the present invention is shown. Common parts are assigned the same reference numbers as in the first embodiment.

Figure 7:
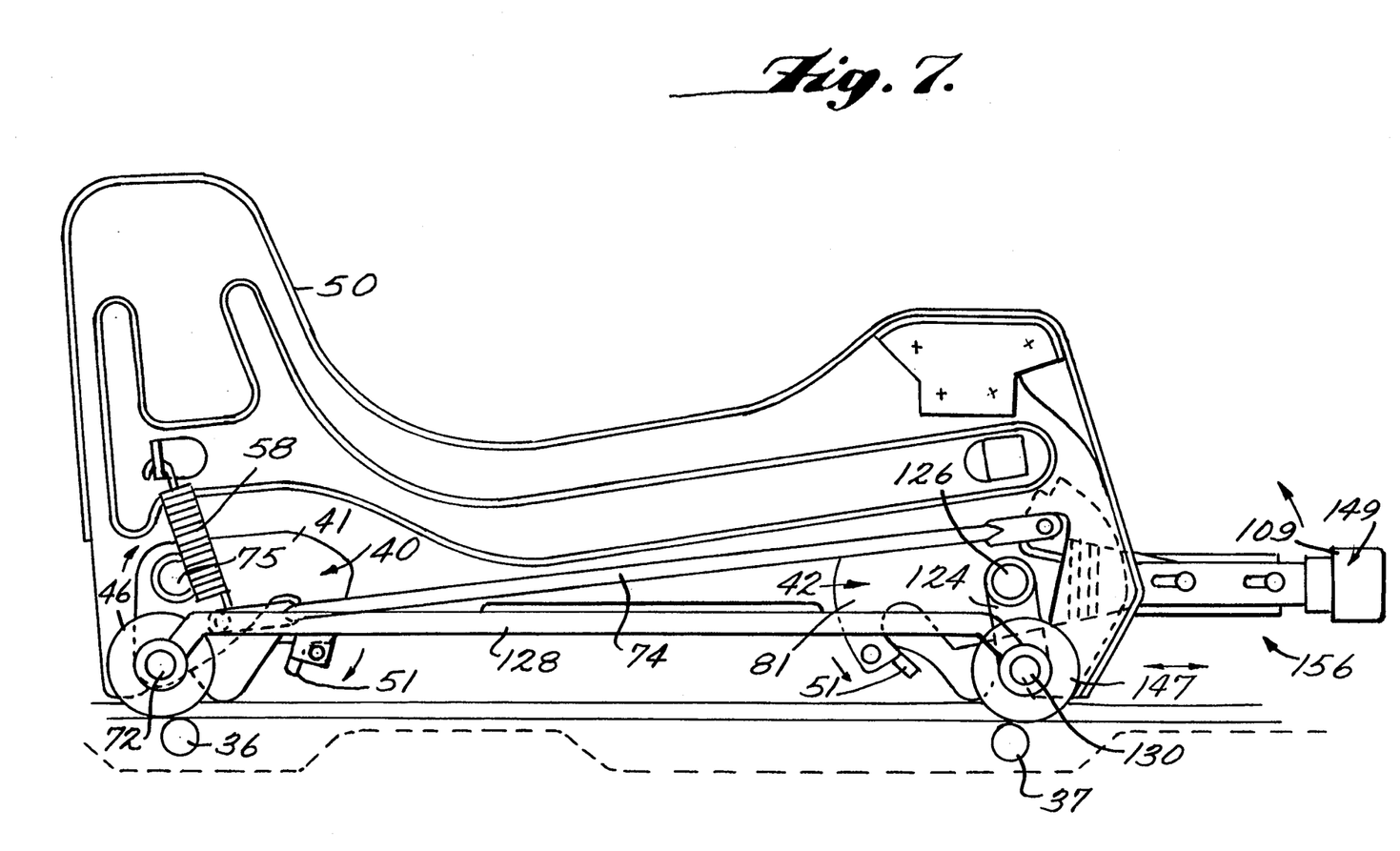
FIG. 7 is a front elevational view of a second embodiment of the latch/release assembly mounted on a riser support provided in accordance with the principles of the present invention shown with its wheels disposed in an operative position.
Figure 8:
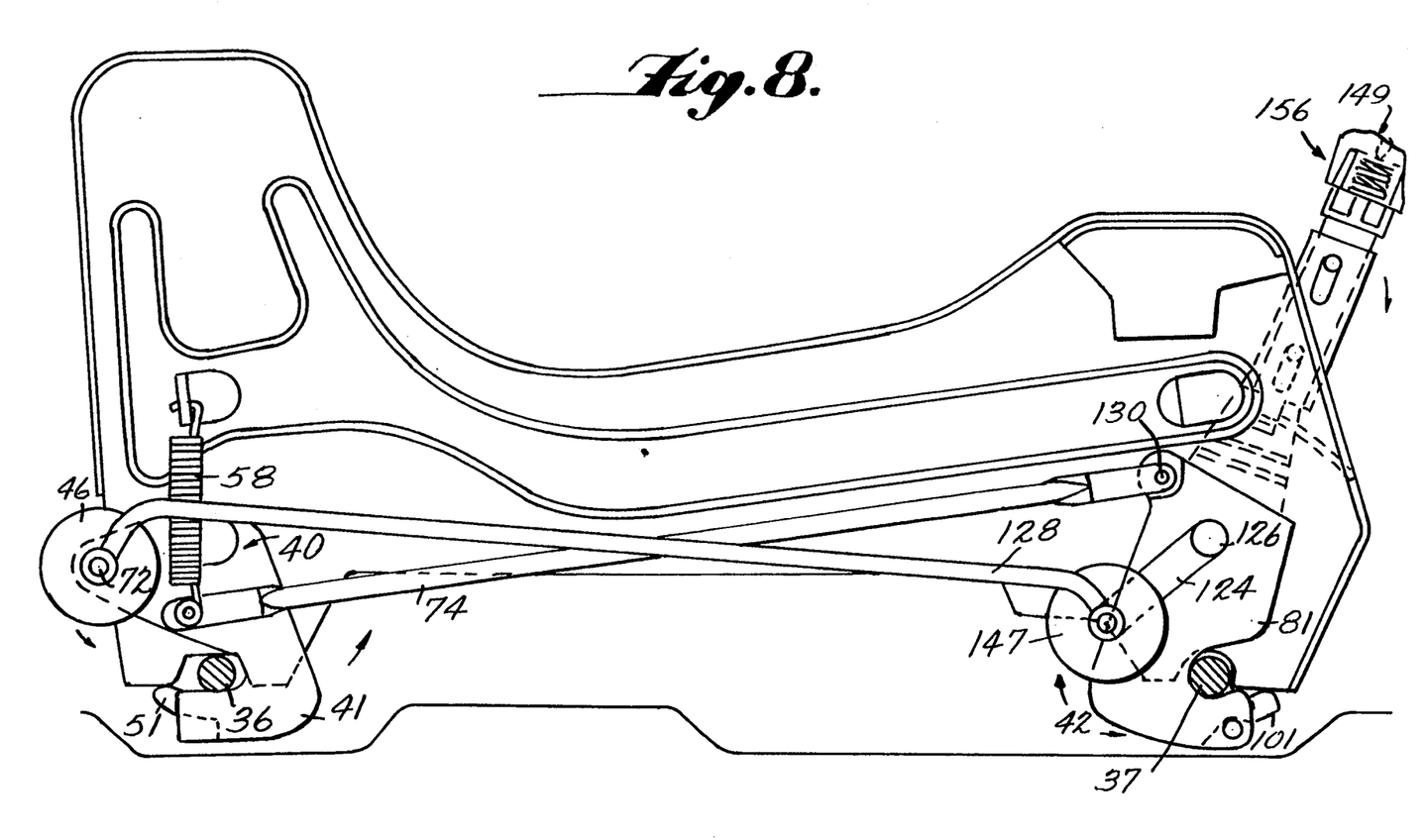
FIG. 8 is a front elevational view of a second embodiment of the latch/release assembly mounted on a riser support provided in accordance with the principles of the present invention shown engaged with a vehicle floor and with its wheels disposed in an inoperative position.
Figure 9:
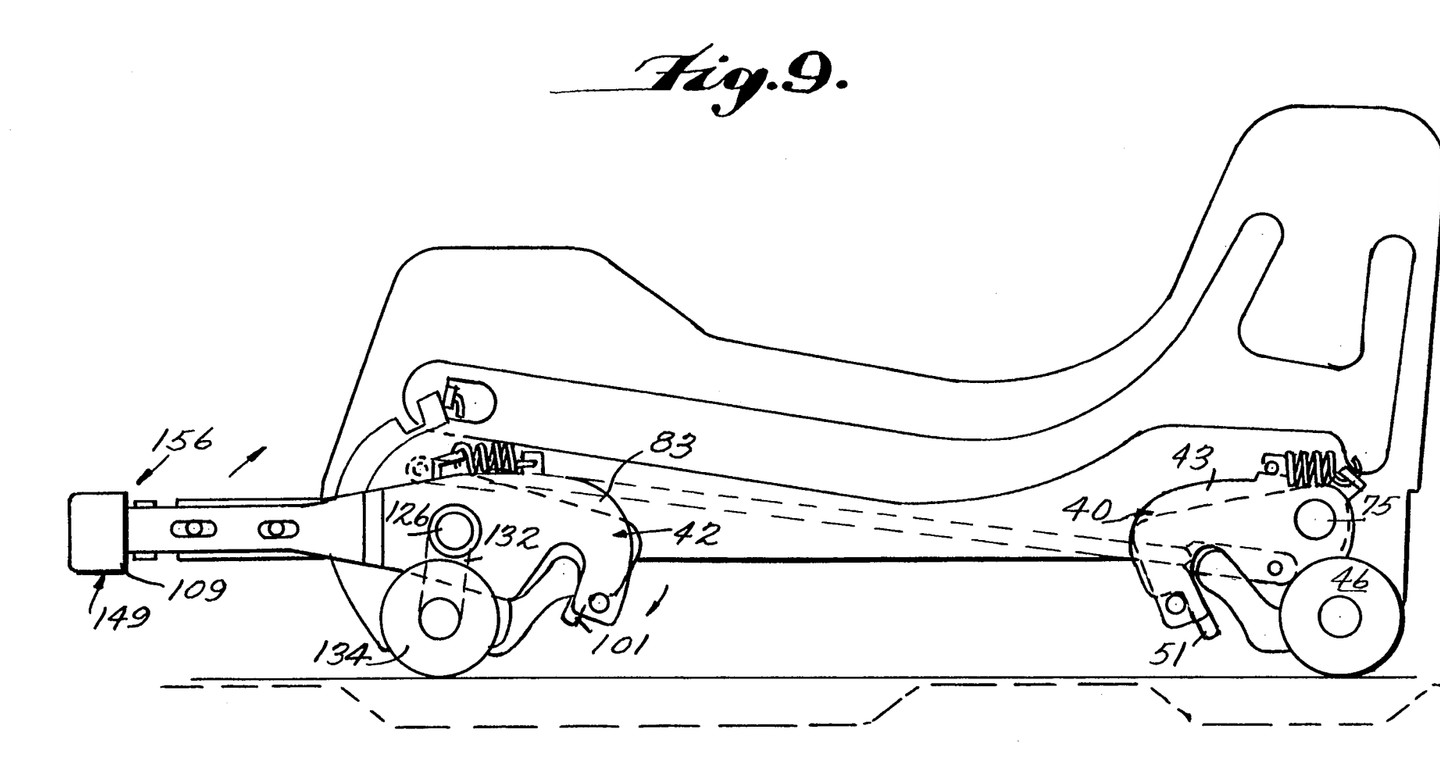
FIG. 9 is a rear elevational view of a second embodiment of the latch/release assembly mounted on a riser support provided in accordance with the principles of the present invention shown with its wheels disposed in an operative position.

As shown in FIG. 7 and 9, wheels 46 are coupled to the front left latch plate 41 and front right latch plate 43, so that the riser support structure 50 is disposed therebetween. As in the first embodiment, the front left latch plate 41 is coupled to the front right latch plate 43 by pivot element 75. Connecting rod 74 of the actuating mechanism 149 couples the forward latch on hook member 40 to the rear latch on hook member 42. Link member 124 pivotally couples wheel 147 to the rear left latch plate 81 of the rear latch member 42. Thus, wheel 147 is free to pivot about pivot point 126. The actuating mechanism 149 includes an actuating link 128 which is coupled at one end thereof to wheel 147 at member 130. The other end of link 128 is coupled to the front left latch plate 41 at axle 72 of wheel 46.

As shown in FIG. 9, a link member 132 pivotally couples wheel 134 to the rear right latch plate 83 of the rear latch member 42. Thus, wheel 134 is also free to pivot about pivot point 126. It can be appreciated that the pairs of wheels (a total of 4 wheel) may be replaced with a single wheels (a total of 2 wheels) to reduce the number of parts.

The operation of the latch/release assembly 156 of the second embodiment is similar to that discussed with reference to the first embodiment. FIGS. 7 and 9 show the riser support structure 50 in a position wherein the wheels are operable so as to move the seat assembly 12 freely into or out of a vehicle 10. In this position, the handle 109 which is part of rear right latch plate 83, has pulled connecting rod 74 of the actuating mechanism 149 rearward causing front latch plate 41 to rotate clockwise together with wheels 46. Since the front latch plate has wheels 46 and actuating link 128 directly attached thereto, the link 128 moves the wheels 147 and 134 to an operative position as they rotated about links 124 and 132. Thus, latch members 40 and 42 move in opposite directions to their inoperative positions while the wheels 46, and 134 and 147 move in the same direction to their operative position.

Figure 10:
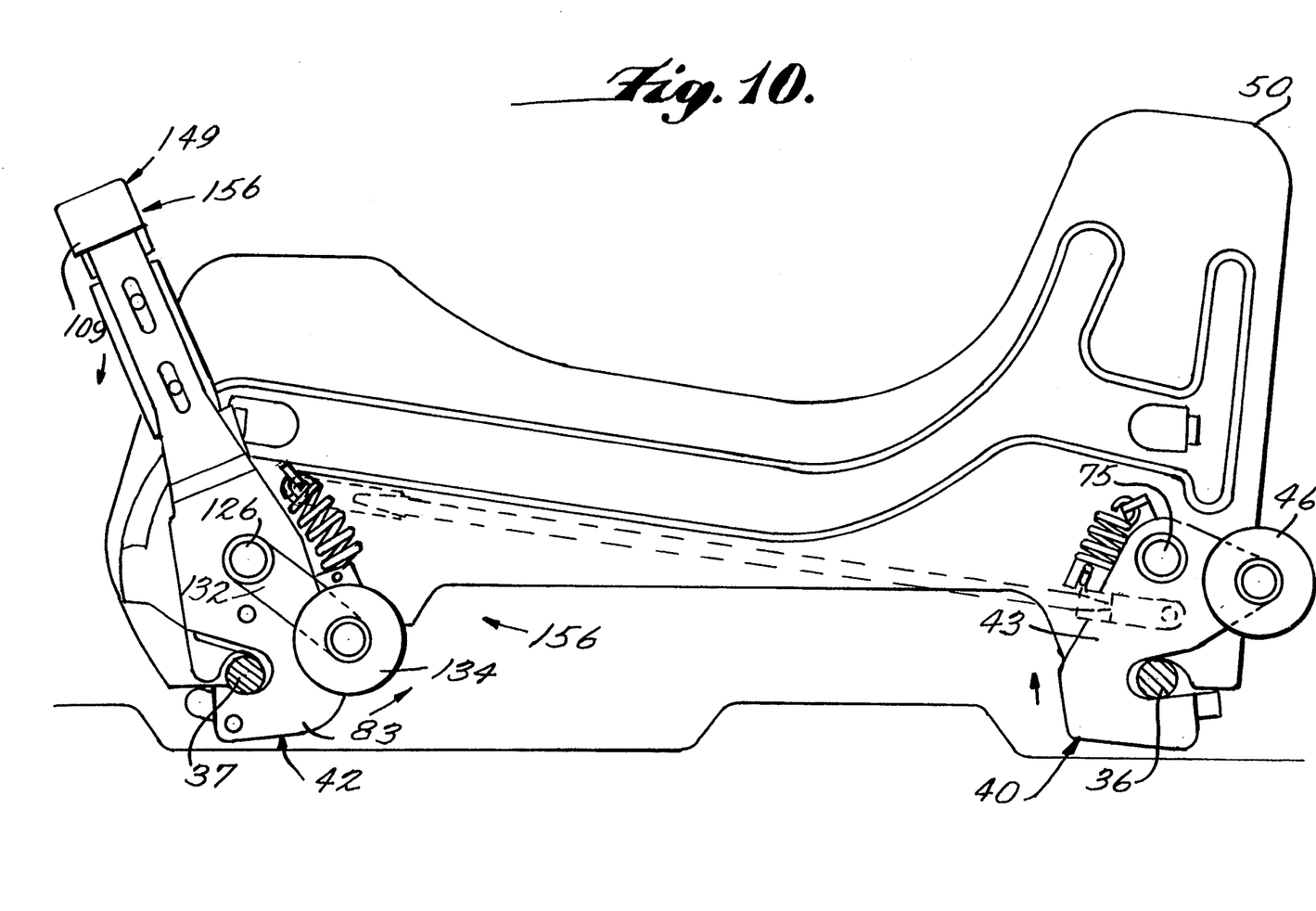
FIG. 10 is a rear elevational view of a second embodiment of the latch/release assembly mounted on a riser support provided in accordance with the principles of the present invention shown engaged with a vehicle floor and with its wheels disposed in an inoperative position.

To move the wheels from the operative position to an inoperative position while simultaneously permitting the latch members 40 and 42 to engage the striker pins 36, 37, the handle 109 is unlocked and raised which moves the rear latch member 42 under the striker pin 37 (FIG. 10). The rear movement of the latch member 42 pushes the connecting rod 74 forward which in turn rotates the front latch member 40 to position under striker pin 36. Since the front latch member 40 has the front wheels 46 and the actuating link 128 directly coupled thereto, the movement of the front wheels 46 is transmitted to the rear wheels 147 and 134 by link 12 which moves wheels 147 on 134 to an inoperative position as they rotate on links 124 and 132 respectively. Thus, the wheels 46, 147 and 134 are simultaneously moved together to their inoperative position above the latch members, 40, 42.

It can be appreciated that the latch/release assembly of the seat assembly can be utilized with various vehicle seats configurations.

It can be seen that the present invention provides a simple and effective means of securely latching a seat assembly in a vehicle and provide a means for removing the assembly from the vehicle without requiring a significant amount of lifting.

It thus will be appreciated that the objects of this invention have been fully and effectively accomplished. It will be realized, however, that the foregoing preferred embodiment of the present invention has been shown and described for the purpose of illustrating the structural and functional principles of the present invention and is subject to change without departure from such principles. Therefore, this invention includes all modifications encompassed within the spirit of the following claims.

What is claimed is:

1. An easily removable vehicle seat for use with a vehicle including floor means having upwardly facing surface means, said floor means having a pair of front and rear wells, disposed with respect to a longitudinal axis of the vehicle, extending below said upwardly facing surface means and anchor members extending across said wells in a position one of above and below said upwardly facing surface means, said vehicle seat comprising:

a pair of rigid support structures disposed on opposite ends of said vehicle seat and having downwardly facing surface means for engaging the anchor members of the vehicle floor means, a cushioned seat structure on said pair of rigid support structures, front and rear hook members mounted on each of said pair of rigid support structures for movement between (1) an operative position extending below the downwardly facing surface means of the associated rigid support structure so as to enter the associated front and rear wells and engage in hooked relationship with the anchor members so as to detachably fixedly retain the rigid support structures and hence the cushioned seat structure thereon in a fixed operative position on said floor means with said anchor members and said downwardly facing surface means of the associated rigid support structure in engagement and (2) an inoperative position disposed above the operative position thereof so as to enable the rigid support structures to be moved relatively over said floor means, front and rear wheel members mounted on each of said pair of rigid support structures for movement between (1) an operative position extending below the downwardly facing surface means of the associated rigid support structure and the associated hook members when in the inoperative position thereof so as to enable the rigid support structures and hence the cushioned seat structure thereon to be rolled in wheel member supported relation over the upwardly facing surface means of the vehicle floor means and (2) an inoperative position disposed above the operative position thereof, and an actuating mechanism associated with each of said pair of rigid support structures constructed and arranged with respect to the associated rigid support structure and cooperable with the hook members and wheel members of the associated rigid support structure so as (1) to move said hook members into the operative position thereof and said wheel members into the inoperative position thereof when it is desired to fixedly retain the rigid support structures and hence the cushioned seat structure thereon in said fixed operative position thereof and (2) to move said hook members into the inoperative position thereof and said wheel members into the operative position thereof when it is desired to move the rigid support structures and hence the cushioned seat structure from the operative position thereof in rolling wheel member supported relation over the upwardly facing surface means of the vehicle floor means.

2. A vehicle seat as claimed in claim 1, wherein said downwardly facing surface means includes a protruding portion having a notch therein, said notch engaging said anchor members when said hook members are disposed in said operative position.

3. A vehicle seat as claimed in claim 1, wherein said front and rear hook members are pivotally coupled to the associated rigid support structure, each of said actuating mechanisms includes (1) a handle operatively coupled to at least one of the associated front and rear hook members for pivotal movement therewith, and (2) a connecting rod coupling the associated front and rear hook members to one another for pivotal movement together in opposite directions.

4. A vehicle seat as claimed in claim 3, wherein said front and rear wheel members of the associated rigid support structure are rotatably mounted on the associated front and rear hook members, respectively for movement therewith.

5. A vehicle seat as claimed in claim 3, wherein each of said actuating mechanisms further includes at least one linking element linking the associated front and rear wheel members to one another for movement together in the same direction.

6. A vehicle seat as claimed in claim 5, wherein at least one of the associated front and rear wheel members is pivotally coupled to at least one of the associated front and rear hook members.

7. A vehicle seat as claimed in claim 3 or 5, wherein each of said actuating mechanisms includes a spring for resiliently biasing the associated hook members toward the inoperative position thereof and a manually releasable locking mechanism for the associated handle for selectively locking the associated front and rear hook members in the operative position thereof against the spring bias.

8. A vehicle seat as claimed in claim 1, wherein each of the associated front and rear hook members includes a spring pressed rattle-prevention element for ensuring a rattle-free engagement thereof with an anchor member when moved to the operative position thereof.

9. A method of installing a removable vehicle seat into a vehicle including floor means having upwardly facing surface means, said floor means having front and rear wells disposed with respect to a longitudinal axis of the vehicle, extending below said upwardly facing surface means and anchor members extending across said wells in a position below said upwardly facing surface means, the method comprising the steps of:

(a) providing a vehicle seat including:
  a pair of rigid support structures disposed on opposite sides of said vehicle seat and having downwardly facing surface means for engaging the anchor members of the vehicle floor means,
  a cushioned seat structure on said pair of rigid support structures,
    front and rear hook members mounted on each of said pair of rigid support structures,
    wheel members mounted on each of said pair of rigid support structures, certain of said wheel members being constructed and arranged with respect to certain of said hook members, (b) moving said certain hook members to an inoperative position while simultaneously moving said certain wheel members to an operative position extending below the downwardly facing surface means of the associated rigid support structure and said certain hook members, (c) moving said vehicle seat into an opening in the vehicle and onto said floor means so that said vehicle seat is disposed in rolling wheel member supported relation over the upwardly facing surface means of the vehicle floor means, (d) rolling said vehicle seat over the upwardly facing surface means until the hook members are disposed over said front and rear wells, (e) moving said certain hook members to an operative position while simultaneously moving said certain wheel members into an inoperative position above the operative position thereof so that said certain hook members extend below the downwardly facing surface means so as to enter the wells and engage in hooked relationship with the anchor members extending thereacross so as to detachably fixedly retain the rigid support structures and hence the cushioned seat structure thereon in a fixed operative position on said floor means with said anchor members and said downwardly facing surface means in engagement.

10. An easily removable vehicle seat assembly for use with a vehicle including floor means having upwardly facing surface means, said vehicle seat assembly comprising:

an anchor assembly including guide surfaces and being coupled to said upwardly facing surface means, said anchor assembly having a pair of front and rear wells disposed with respect to a longitudinal axis of the vehicle, extending below said upwardly facing surface means and anchor members extending across said front and rear wells in a position one of above and below said upwardly facing surface means; and a vehicle seat including:
a pair of rigid support structures having downwardly facing surface means for engaging the anchor members of the anchor assembly,
a cushioned seat structure on said pair of rigid support structures,
front and rear hook members mounted on each of said rigid support structures for movement between (1) an operative position extending below the downwardly facing surface means of the associated rigid support structure so as to enter the wells and engage in hooked relationship with the anchor members extending thereacross so as to detachably fixedly retain the rigid support structures and hence the cushioned seat structure thereon in a fixed operative position on said floor means with said anchor members and said downwardly facing surface means in engagement and (2) an inoperative position disposed above the operative position thereof so as to enable the rigid support structures to be moved relatively over said guide surfaces,
front and rear wheel members mounted on each of said rigid support structures for movement between (1) an operative position extending below the downwardly facing surface means of the associated rigid support structure and the associated hook members when in the inoperative position thereof so as to enable rigid support structures and hence the cushioned seat structure thereon to be rolled in wheel member supported relation over the guide surfaces and thus over the vehicle floor means and (2) an inoperative position disposed above the operative position thereof, and
an actuating mechanism associated with each of said pair of rigid support structures and being constructed and arranged with respect to the associated rigid support structure and cooperable with the hook members and wheel members of the associated rigid support structure so as (1) to move said hook members into the operative position thereof and said wheel members into the inoperative position thereof when it is desired to fixedly retain the rigid support structures and hence the cushioned seat structure thereon in said fixed operative position thereof and (2) to move said hook members into the inoperative position thereof and said wheel members into the operative position thereof when it is desired to move the rigid support structures and hence the cushioned seat structure thereon from the operative position thereof in rolling wheel member supported relation over the upwardly facing surface means of the vehicle floor means and over said guide surfaces.

11. An easily removable vehicle seat for use with a vehicle including floor means having upwardly facing surface means, said floor means having front and rear wells, disposed with respect to a longitudinal axis of the vehicle, extending below said upwardly facing surface means and anchor members extending across said wells in a position one of above and below said upwardly facing surface means, said vehicle seat comprising:

a pair of rigid support structures disposed on opposite ends of said vehicle seat and having downwardly facing surface means for engaging the anchor members of the vehicle floor means,
a cushioned seat structure on said pair of rigid support structures,
front and rear hook members mounted on each of said pair of rigid support structures for movement between (1) an operative position extending below the downwardly facing surface means the associated rigid support structure so as to enter the front and rear wells and engage in hooked relationship with the anchor members so as to detachably fixedly retain the associated rigid support structure and hence the cushioned seat structure on said pair of rigid support structures in a fixed operative position on said floor means with said anchor members and said downwardly facing surface means in engagement and (2) an inoperative position disposed above the operative position thereof so as to enable the associated rigid support structure to be moved relatively over said floor means, and
wheel members mounted on said rigid support structures for movement between (1) an operative position extending below the downwardly facing surface means of said rigid support structures and hook members thereon when in the inoperative position thereof so as to enable the rigid support structures and hence the cushioned seat structure thereon to be rolled in wheel member supported relation over the upwardly facing surface means of the vehicle floor means and (2) an inoperative position disposed above the operative position thereof,
certain of said hook members being constructed and arranged with respect to certain of said wheel members so as to be moved from the operative position thereof to the inoperative position thereof and from the inoperative position thereof to the operative position thereof while said certain wheel members are moved simultaneously from the inoperative position thereof to the operative position thereof and from the operative position thereof to the inoperative position thereof, respectively.

12. A vehicle seat as defined in claim 11, wherein the hook members associated with each of said pair of rigid support structures are pivotally mounted on the associated support structure for simultaneous movement in opposite directions into said operative and inoperative positions thereof.

13. A vehicle seat as defined in claim 12, wherein said certain wheel members are mounted on said certain hook members.

14. A vehicle seat as defined in claim 13, wherein said certain hook members comprise the front hook members associated with each of said pair of rigid support structures.

15. A vehicle seat as defined in claim 14, wherein said certain hook members comprise front and rear hook members associated with each of said pair of rigid support structures.

16. A vehicle seat as defined in claim 12, wherein said certain wheel members include front and rear wheel members on each of said pair of rigid support structures constructed and arranged to be moved simultaneously.

17. A vehicle seat as defined in claim 16, wherein the front and rear wheel members on each of said pair of rigid support structures are pivotally moved simultaneously in the same direction.

18. A vehicle seat as defined in claim 16, wherein the front and rear wheel members on each of said pair of rigid support structures are pivotally moved simultaneously in opposite directions.

19. A riser support assembly for supporting a portion of a cushioned seat structure of a vehicle seat for use in a vehicle including floor means having upwardly facing surface means, said floor means having front and rear wells, disposed with respect to a longitudinal axis of the vehicle and extending below said upwardly facing surface means and anchor members extending across said wells in a position one of above and below said upwardly facing surface means, said riser support assembly comprising:

rigid support structure constructed and arranged to be mounted to a portion of the seat structure and having downwardly facing surface means for engaging the anchor members of the vehicle floor means, front and rear hook members mounted on said rigid support structure for movement between (1) an operative position extending below the downwardly facing surface means so as to enter the front and rear wells and engage in hooked relationship with the anchor members so as to detachably fixedly retain the rigid support structure and the portion of the seat structure when mounted thereon in a fixed operative position on said floor means with said anchor members and said downwardly facing surface means in engagement and (2) an inoperative position disposed above the operative position thereof so as to enable the rigid support structure and the portion of the seat structure when mounted thereon to be moved relatively over said floor means, and front and rear wheel members mounted on the rigid support structure for movement between (1) an operative position extending below the downwardly facing surface means of the rigid support structure and the hook members when in the inoperative position thereof so as to enable the rigid support structure and the portion of the seat structure when mounted thereon to be rolled in wheel member supported relation over the upwardly facing surface means of the vehicle floor means and (2) an inoperative position disposed above the operative position thereof, said hook members being constructed and arranged with respect to said wheel members so as to be moved from the operative position thereof to the inoperative position thereof and from the inoperative position thereof to the operative position thereof while said wheel members are moved simultaneously from the inoperative position thereof to the operative position thereof and from the operative position thereof to the inoperative position thereof, respectively.

20. A riser support assembly as defined in claim 19, wherein the hook members are pivotally mounted on the rigid support structure for simultaneous movement in opposite directions into said operative and inoperative positions thereof.

21. A riser support assembly as defined in claim 20, wherein the front and rear wheel members are pivotally moved simultaneously in the same direction.

22. A riser support assembly as defined in claim 20, wherein the front and rear wheel members are pivotally moved simultaneously in opposite directions.

* * * * *